J. L. SCHRODE.
AUTOMATIC OILER.
APPLICATION FILED NOV. 22, 1906.
912,740.
Patented Feb. 16, 1909.
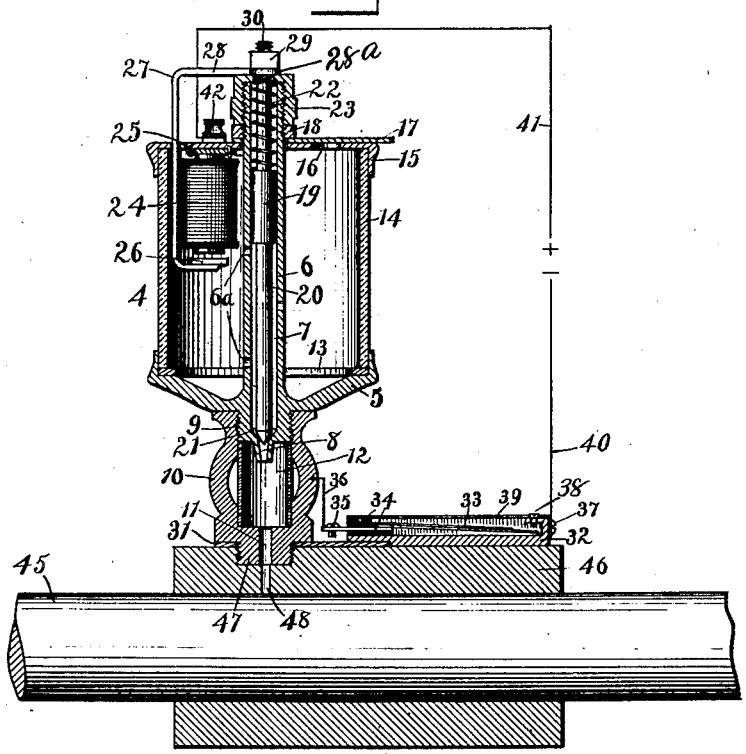
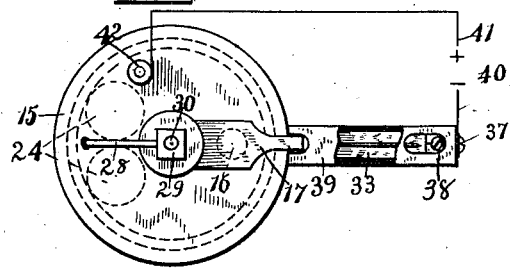
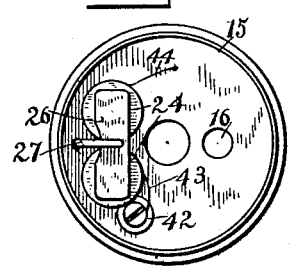
WITNESSES:
Matt Marty
Chas. F. Bassett
INVENTOR
John L. Schrode
BY Frederick Benjamin
ATT'Y.

UNITED STATES PATENT OFFICE.

JOHN L. SCHRODE, OF MARION, KENTUCKY.

AUTOMATIC OILER.

No. 912,740.  Specification of Letters Patent.  Patented Feb. 16, 1909.

Application filed November 22, 1906. Serial No. 344,599.

*To all whom it may concern:*

Be it known that I, JOHN L. SCHRODE, citizen of the United States, residing at Marion, in the county of Crittenden and State of Kentucky, have invented certain new and useful Improvements in Automatic Oilers, of which the following is a specification.

My invention relates to lubricating devices and its object is to produce an automatic oiler for journals, slide blocks or any bearings which are liable to become heated when the supply of oil becomes deficient. The physical properties of the substances used for lubricating purposes render it practically impossible to produce a purely mechanical device which will supply a uniform quantity of the lubricant to a bearing, or that will vary such supply according to the changing circumstances and conditions such as intermitting movements of the machinery and variations in the temperature of the air.

The chief objects of my invention are to provide an automatic device that will regulate the flow of oil to a bearing so that the quantity supplied will change to correspond with the varying conditions. Thus when the journal is revolving slowly the automatic adjustment will permit only a small quantity of the lubricant to enter the bearing. Should, however, the shaft be given a greater speed, or if the orifice through which the oil is fed should become partially clogged and the journal begin to heat the automatic features of the device will cause an increase in the oil flow.

Another object of my improvement is to provide means for manually adjusting the mechanism so as to regulate the flow. This will sometimes be necessary on account of a change in the kind of oil used or during extremes of atmospheric temperature.

I make use of the variations produced in the temperature of the bearing to bring about the desired automatic action. Attempts have heretofore been made to utilize this factor in producing a similar effect by causing the requisite mechanical movements directly from a thermostat, which has generally been a metal either in fluid or solid form. The results so far have not been satisfactory and this failure has been due in large measure to the inability to produce a sufficient movement in the valve when the variations in the thermostat are slight. It has been my aim to overcome this disadvantage by the employment of an electro-magnet to govern the oil valve directly, an electric battery or other source of electricity to energize said magnet and to control the electric circuit by means of a thermostat attached to the oil cup.

In the accompanying drawing which forms a part of this specification:—Figure 1 is a longitudinal sectional view of my improved automatic lubricator shown attached to a bearing, a portion of the drawing being diagrammatic; Fig. 2 is a plan view of the device the electrical connections being diagrammatic and Fig. 3 is a plan view of the under side of the cover removed from the cup.

Referring to the drawing the numeral 4 indicates an oil-cup, supported by a base 5 from the center of which rises a tube 6, provided with a plurality of openings 6ª through which the oil passes to the bore 7 of said tube, the lower extremity of which has a conical aperture 8. The lower part of the said bore is reduced in size and provided with threads 9 which engage internal threads in a tubular support 10. The lower portion of said support has a central passage 11 communicating with its bore, and within the support is located a sight-feed glass in the form of a hollow cylinder 12, open at both ends.

A packing ring 13 is interposed between the body 14 of the oil cup and the base 5. The body 14 is preferably made of glass in the common form of oiler, and is closed above by a cap or cover 15 furnished with an orifice 16 for filling and has a closure 17 mounted to turn upon the central tube 6. A nut 18 engaging threads on said tube holds the cover in place upon the cup. A plunger 19 is fitted to the bore 7 and is reduced below to form a valve stem 20 leaving a space between said stem and the walls of the tube to allow the oil to pass freely downward. The lower end of the stem 20 is conical in shape to engage a similarly shaped valve seat 21 formed at the junction of the bore 7 with the aperture 8. The upper part of the plunger 19 is reduced and upon this is mounted a coiled spring 22 which engages the shoulder formed by the said reduction and is held in place by a cap 23 which is threaded to engage the threads upon the outer surface of the tube 6. An electro magnet 24 secured to the under side of the cover 15 by screws or rivets 25 is provided with an armature 26 to which is rigidly fastened a bent arm 27 which projects through an aperture in the cover 15 and is then bent to form an extension 28 which is bent into an eye 28ª to encircle the upper reduced end of the plunger, where it is held in place by a nut 29 engaging threads 30 on said reduced end of the plunger.

The support 10 rests upon a plate 31 which extends laterally and is attached to a frame piece 32 which carries a thermostat 33 consisting of a compound bar formed by joining two unequally expansible metals, in a well known manner. One end of said thermostat supported by insulating blocks 34 is furnished with a binding screw 35. To this is secured an electric conductor 36 which is in electric contact with the metal of the apparatus. In the opposite end of the frame 32 is a binding screw 37 in electric connection with a contact screw 38 which passes through a protective cover 39 for the thermostat. A wire 40 connects the screw 37 with the source of electric energy and from the latter a wire 41 makes electric connection with a binding post 42 to which one terminal 43 of the electro magnet leads, while the other terminal 44 is in electric contact with the metal cover 15.

45 represents a fragment of a shaft journaled in a bearing 46. The lower end 47 of the support 10, reduced in size, is screwed into the bearing 46 to give the apparatus a firm support. An oil hole 48 in the bearing registers with the passage 11.

The operation of the device is as follows:—
A sufficient quantity of oil having been placed in the cup to cover one or more of the orifices 6ª the tension of the spring 22 is adjusted by means of the nut 29 so that the valve 21 will admit a certain quantity of oil to the bearing. The proper connections having been made with the source of electrical energy as described above, and the shaft having been put in motion there will be no change in the position of the valve 21 unless the bearing should become heated to a sufficient extent to cause the thermostat to make contact with screw 38. The instant such contact is made the electro magnet will become energized and the armature 26 will be raised by the attraction of the magnet. Through the attached arm 27 and projections 28 the plunger 19 will be lifted and the valve 21 opened and a greater quantity of oil will flow therethrough. As soon as the bearing has become cooled by this augmented supply of the lubricant the thermostat will resume its initial position breaking the contact with the point of the screw 38 allowing the armature to fall and permitting the valve 21 to resume its original position. By turning the screw 38 the sensitiveness of the thermostat may be increased or diminished and the automatic feature of the appliance regulated to a nicety.

Having thus described my invention, what I claim as new and desire to secure by Letters Patent, is:—

1. In an automatic oiler, the combination with an oil cup, a cover therefor, a sight-feed chamber, a valve between the said chamber and cup, and a valve stem extending through said cup and cover, of an electro-magnet suspended from said cover within the cup, an armature for the magnet, a bent arm attached to the armature and projecting externally, a connection between said arm and the valve-stem, a thermostat, and circuit connections between said magnet and a source of electric energy, said connections including the thermostat and the casing of the oil cup.

2. In an automatic oiler, the combination with an oil cup, a cover therefor, a sight-feed chamber below the cup, a valve between the chamber and said cup, and a valve stem extending through said cover, of an electro-magnet suspended from said cover within the cup, an armature for the magnet, a bent arm attached to the armature and projecting externally to the cup, a slidable connection between the said arm and the valve stem, a thermostat arranged externally to the oil cup, and circuit connections between said magnet and a source of electric energy, said connection including the thermostat and the casing of the cup.

3. In an automatic oiler, the combination with an oil cup, having a cover, a sight-feed chamber below the cup, a valve between the chamber and said cup, and a valve stem extending externally to the cover, of an electro-magnet suspended from said cover within the cup, an armature for the magnet, a rigid bent arm attached to the armature and projecting externally to the cup, an adjustable connection between the said arm and the valve stem, a thermostat arranged externally to the cup, a battery, and circuit wires between said magnet and the battery, said wires including the thermostat and casing of the oil cup in circuit.

In testimony whereof I affix my signature in presence of two witnesses.

JOHN L. SCHRODE.

Witnesses:
WILLIAM T. DAUGHTREY,
FREDERICK WARREN HUNN.